UNITED STATES PATENT OFFICE.

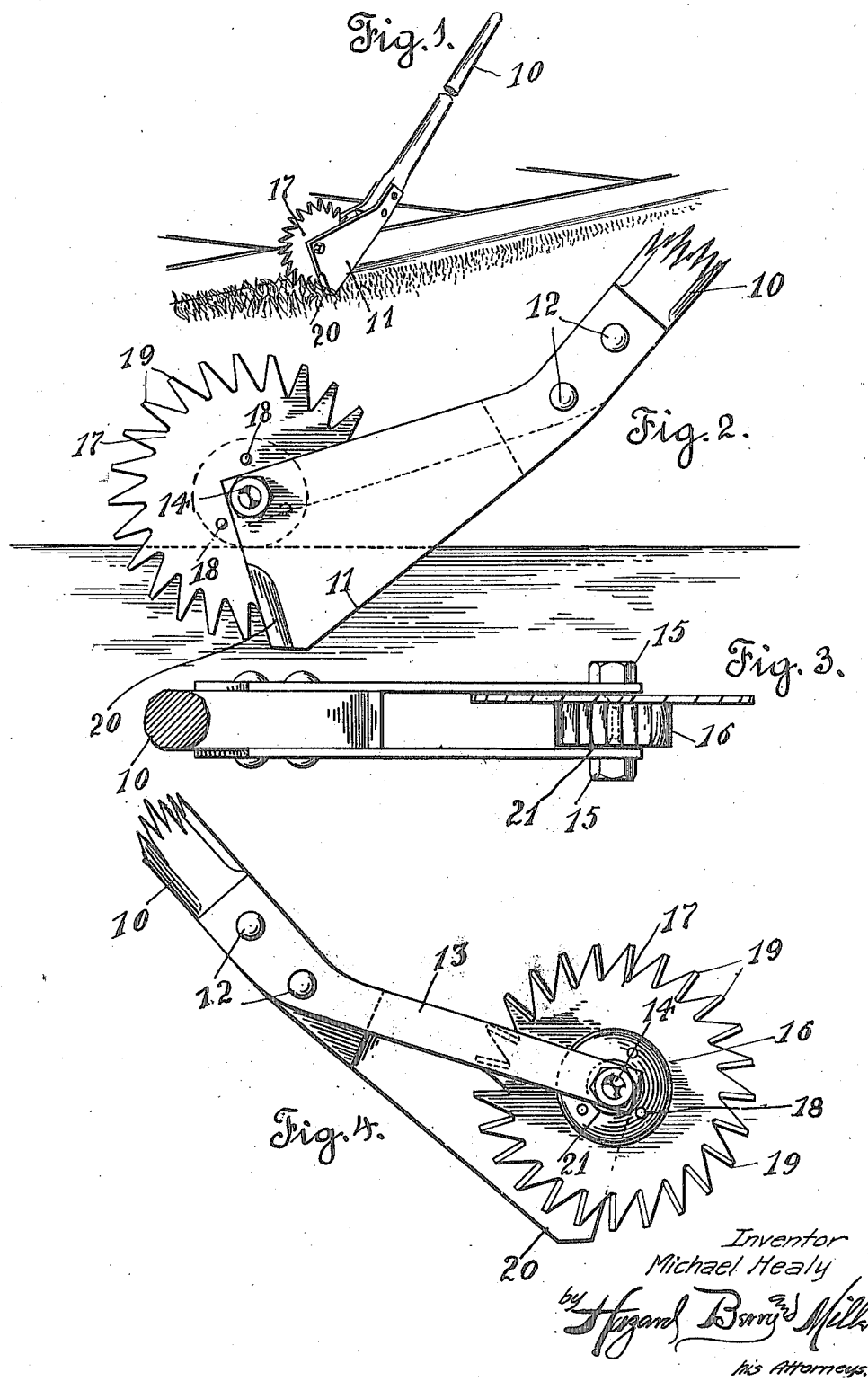

MICHAEL HEALY, OF LONG BEACH, CALIFORNIA.

EDGER FOR LAWNS.

1,185,093.

Specification of Letters Patent. Patented May 30, 1916.

Application filed December 13, 1915. Serial No. 66,623.

*To all whom it may concern:*

Be it known that I, MICHAEL HEALY, a citizen of the United States, residing at Long Beach, in the county of Los Angeles and State of California, have invented new and useful Improvements in Edgers for Lawns, of which the following is a specification.

My invention relates to a device for cutting the grass along the edge of a lawn and adjacent to a sidewalk.

It is an object of this invention to construct an apparatus, simple of construction and positive in operation which will cut the grass along the edge of a sidewalk. The same consists of a rotating disk provided with cutter teeth which coöperate with a stationary cutter blade. The disk is rigidly secured to a roller rotatable mounted on a stationary shaft. The apparatus is propelled along the edge of the walk, the roller being pushed along the walk by means of a handle whereby rotary movement is imparted to the cutter disk which travels along the vertical edge of the walk. The grass will be cut by the cutter disk and the stationary blade coöperating therewith so that the edge of the lawn will be neatly trimmed, leaving the walk perfectly free from any overspreading grass.

With the foregoing and other objects in view, which will appear as the description proceeds, my invention consists in the construction and arrangement of parts hereinafter described and claimed.

In the accompanying drawings, which form a part of this specification, I have illustrated a convenient and practical embodiment of my invention, and in which:

Figure 1 is a perspective view of my apparatus in operation. Fig. 2 is a side elevation of the same with the handle broken away. Fig. 3 is a top plan view of the apparatus. Fig. 4 is a side elevation of the apparatus showing the reverse side of that of Fig. 2.

10 designates a handle of suitable length whereby the apparatus may be pushed along in its operation. At the lower end thereof, a stationary cutter blade 11 is rigidly secured thereto by means of a suitable fastening device such as rivets 12, which passing through the lower end of the handle 10 secure the cutter blade 11 on one side thereof and an arm 13 extending in parallel and spaced relation to said cutter blade, on the other.

A horizontal stationary pin or shaft 14 connects the outer end of arm 13 with the upper outer corner of the cutter blade 11. The extremities of said pin are screw threaded, and nuts 15, engaging said extremities, hold the pin 14 in place. Rotatably mounted on said pin is a disk operating roller 16 to which, on the side adjacent to the cutter blade, a cutter disk 17 is rigidly secured by any suitable fastening, such as screws 18. The periphery of the disk is provided with a series of teeth 19 having cutting edges 19', which are adapted to coöperate with a cutting edge 20 on the lower forward edge of the cutter blade 11.

21 is a spacing washer loosely mounted on pin 14 between the arm 13, and the roller 16.

From the foregoing description, the operation of my lawn edger will be easily understood. The apparatus is placed on the edge of the walk so that the lower portion of the cutter disk is immediately adjacent to the vertical edge of the walk, the roller 16 being on the horizontal surface thereof. As the handle is pushed and the roller 16 is moved along the walk, a rotary movement will be imparted to the cutter disk, which will cut the grass along this line, making a vertical cut, the blades of grass being cut by the scissor-like action of the cutter disk and the stationary cutter blade. Any grass overspreading the edge of the walk from the lawn will be neatly cut along the edge of the walk, thus giving the lawn and the walk a neat and trim appearance.

Various changes in the construction and arrangements of the parts of the apparatus may be made by those skilled in the art without departing from the spirit of my invention as claimed.

I claim:

1. An edger for lawns comprising a handle, a pair of spaced cutter disk supporting members rigidly mounted thereon, one of said members being provided with a straight and substantially vertical cutting blade, a fixed shaft secured between the outer ends of said members, a drive roller rotatably mounted on said shaft, and a toothed cutter disk rigidly mounted on said roller adjacent said blade and provided with cutting teeth coöperating with said blade.

2. An edger for lawns comprising a handle, a pair of spaced members rigidly mounted thereon, a blade provided at the lower portion of the forward edge of one of said members, a shaft mounted in the forward ends of said members and extending therebetween, a drive roller rotatably mounted on said shaft, a cutter disk rigidly mounted to said roller and rotatably mounted on said shaft adjacent to said blade member, cutting teeth on the periphery of said cutter disk, the cutting edges of said teeth extending substantially radially to the center of said shaft, the cutting edges of said teeth and said blade being adapted to co-act with each other on a line extending substantially vertically from the center of said shaft, and the cutting edges of said teeth extending outwardly to such a point as to come substantially flush with the lower extremity of said blade, when said edges co-act to cut the grass.

In testimony whereof I have signed my name to this specification.

M. HEALY.